July 12, 1932. W. S. GAINES, JR 1,867,313
WINDOW CHANNEL
Filed Oct. 13, 1930
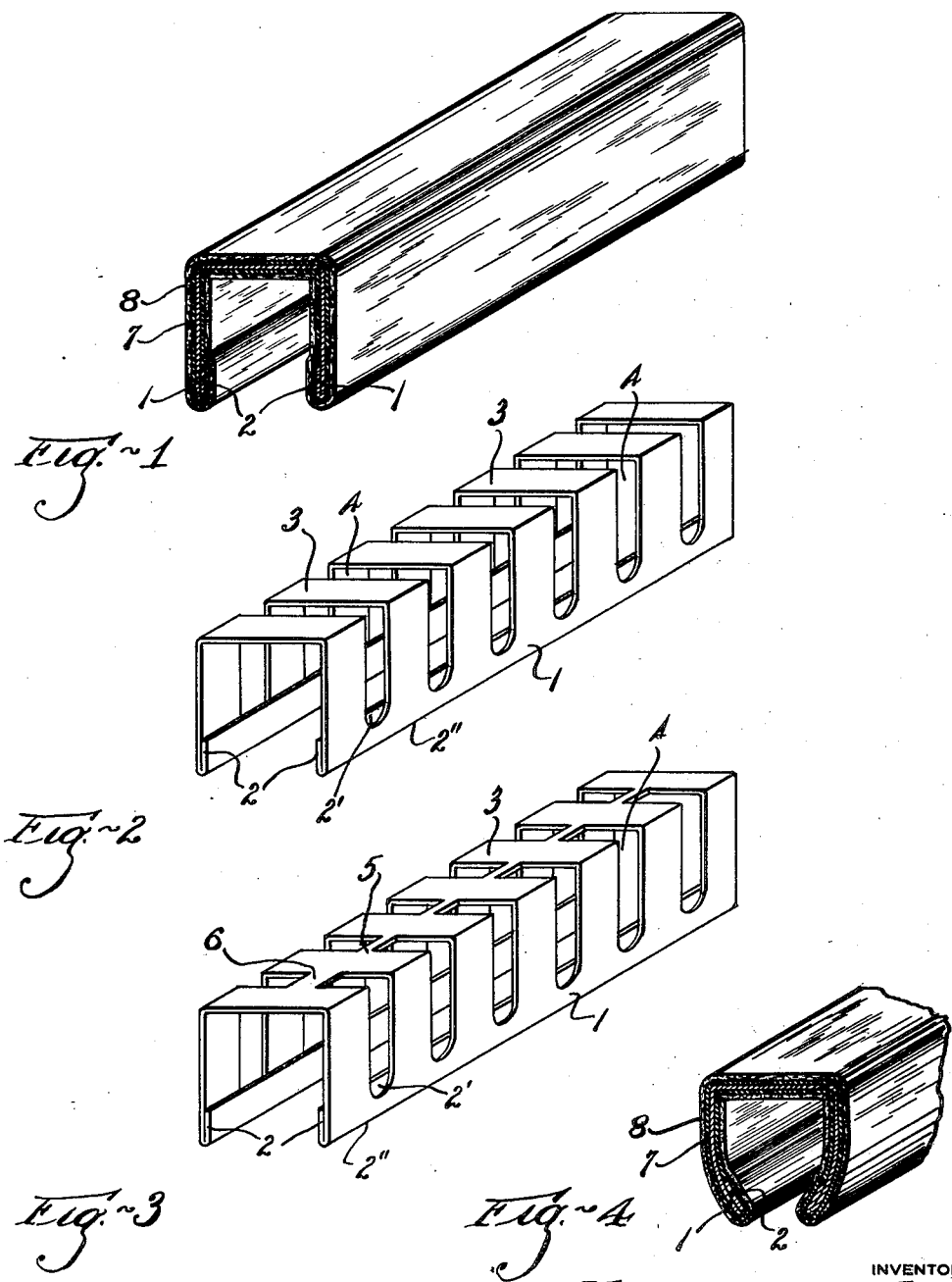
INVENTOR
WALTER S. GAINES JR.
BY
Brockett, Hyde, Higley & Meyer
ATTORNEYS Patented July 12, 1932

1,867,313

UNITED STATES PATENT OFFICE

WALTER S. GAINES, JR., OF EAST CLEVELAND, OHIO, ASSIGNOR TO THE REID PRODUCTS COMPANY, OF CLEVELAND, OHIO, A CORPORATION OF OHIO

WINDOW CHANNEL

Application filed October 13, 1930. Serial No. 488,287.

The invention disclosed in this application relates to glass run channel for the edges of windows, and particularly to a fabricated channel for cushioning and guiding the edges of sliding windows for motor vehicles, and the like.

The tendency of the automotive industry at this time is toward the adoption of new shapes for the window and door openings. These shapes often take curved or arched forms at the top, requiring that the channel for receiving the window pane follow the configuration of the window opening and be capable of being bent or formed to such shape without losing the original cross sectional configuration or any of the necessary cushioning and guiding characteristics.

Specifically the invention in this case resides in a channel made up of a core stamped out in skeleton form and comprising folded beaded edges and connecting straps spaced apart and connecting said edges, with the entire core, when covered, bent into substantially U-shaped channel form with the edges extending inward for engagement with the glass.

It is also a feature of the invention to have the folded portion of the edge, forming the bead, extend beyond the ends of the spaces or slots formed between the connecting straps to re-enforce the parts at this point and either prevent tearing or do away with the disastrous effects resulting from the tearing when the channel is bent in various forms.

A further feature of the invention is the provision of a connecting web between the cross straps at the middle of the base of the channel to maintain these cross straps in position and preserve the structure of the core. These webs are sufficiently fragile to break upon extreme bending of the channel in one direction and collapse in the bending of the channel in the other direction.

The invention is disclosed in the following description, drawing and claims.

Referring to the drawing, Fig. 1 is a perspective view of a piece of channel constructed according to the invention, with the sides of the substantially U-shaped channel extending out straight; Fig. 2 is a similar view of a portion of the core; Fig. 3 is a similar view showing the webs between cross straps at the back of the channel; and Fig. 4 is a perspective view of a finished piece of channel with the flanges bent inward.

In the embodiment shown, the channel includes a core of thin spring metal or the like, stamped out to form edges 1, each folded back at 2 upon itself to form a bead. These edges are connected by transverse straps 3 spaced to provide slots indicated at 4, which terminate between the inner edge 2' of the folded edge portion 2 and the extreme outer edge 2'' of the core edge. Such a core lends itself nicely to the bending of the channel back and forth in the plane of the opening of the channel, or in other words, in the plane of the glass pane which the channel is adapted to receive. The slots between the cross straps permit this bending.

In the arrangement shown in Fig. 3, the cross straps 3 are connected by longitudinally extending webs which may be narrow webs, as shown at 5, or may be made wider as shown at 6. In any event, these webs connect the cross straps at the base and not only hold them in line, but tend to give the entire core sufficient rigidity to cause it to hold its shape in handling and in use in the window frame. When the core is bent in a direction to open up the back portion formed by the straps 3, the webs are stretched, ruptured, or broken, whereas on a reverse bend these webs are sufficiently fragile to buckle or bend and permit such a type of bending.

If desirable, the core may be wholly or partially covered with a coating of rubber 7 and upon this may be provided an outer covering 8 of felt or the like. These various coverings, as above indicated, may extend over the inner and outer surfaces of the channel.

In Fig. 4 the channel is shown in finished form where the outer ends of the side members are bent toward each other to grip the glass.

Having described my invention, I claim:

1. A metal core for a window channel, comprising a generally channel-shaped flexible metal member having continuous longitudinal edge portions, which edge portions constitute the free or upper edge portions of the side walls of said channel member, said edge portions being connected by transverse strap portions longitudinally spaced to form therebetween transverse slots each extending from a point within one side wall of said channel member through the bottom thereof to a point within the opposite side wall of said channel member, whereby said channel member may be flexed back and forth in the plane to be occupied by the window pane which said channel member is adapted to receive, and reenforcing metal means lying alongside said longitudinal edge portions and lapping over the ends of said slots, whereby tearing of said edge portions at the ends of said slots is at least minimized.

2. A metal core for a window channel, comprising a generally channel-shaped flexible metal member having continuous longitudinal edge portions, which edge portions constitute the free or upper edge portions of the side walls of said channel member, said edge portions being connected by transverse strap portions longitudinally spaced to form therebetween transverse slots each extending from a point within one side wall of said channel member through the bottom thereof to a point within the opposite side wall of said channel member, whereby said channel member may be flexed back and forth in the plane to be occupied by the window pane which said channel member is adapted to receive, each of said longitudinal edge portions having its outer edge part bent back upon the other parts thereof, said bent back parts lapping over the ends of said slots, whereby tearing of said edge portions at the ends of said slots is at least minimized.

3. A metal core for a window channel, comprising a generally channel-shaped flexible metal member having continuous longitudinal edge portions, which edge portions constitute the free or upper edge portions of the side walls of said channel member, said edge portions being connected by transverse strap portions longitudinally spaced to form transverse slots therebetween, and longitudinally disposed metal webs connecting said straps at substantially the middle of the base of said channel member, said webs being adapted to fracture or buckle upon the flexing of the channel member in the plane to be occupied by the window pane which said channel member is adapted to receive, said slots lying on opposite sides of said webs and each slot extending transversely from one of said webs to a point within one of the side walls of said channel.

4. A metal core for a window channel, comprising a generally channel-shaped flexible metal member having continuous longitudinal edge portions, which edge portions constitute the free or upper edge portions of the side walls of said channel member, said edge portions being connected by transverse strap portions longitudinally spaced to form transverse slots therebetween, and longitudinally disposed webs integral with said straps and connecting the same at substantially the middle of the base of said channel member, said webs being adapted to fracture or buckle upon the flexing of the channel member in the plane to be occupied by the window pane which said channel member is adapted to receive, said slots lying on opposite sides of said webs and each slot extending transversely from one of said webs to a point within one of the side walls of said channel.

5. A metal core for a window channel, comprising a generally channel-shaped flexible metal member having continuous longitudinal edge portions, which edge portions constitute the free or upper edge portions of the side walls of said channel member, said edge portions being connected by transverse strap portions longitudinally spaced to form transverse slots therebetween, longitudinally disposed metal webs connecting said straps at substantially the middle of the base of said channel member, said webs being adapted to fracture or buckle upon the flexing of the channel member in the plane to be occupied by the window pane which said channel member is adapted to receive, said slots lying on opposite sides of said webs and each slot extending transversely from one of said webs to a point within one of the side walls of said channel, and reenforcing metal means lying alongside said longitudinal edge portions and lapping over the ends of said slots, whereby tearing of said edge portions at the ends of said slots is at least minimized.

In testimony whereof I hereby affix my signature.

WALTER S. GAINES, Jr.